United States Patent
Watanabe et al.

(10) Patent No.: US 6,411,274 B2
(45) Date of Patent: *Jun. 25, 2002

(54) DIGITAL MAP DISPLAY ZOOMING METHOD, DIGITAL MAP DISPLAY ZOOMING DEVICE, AND STORAGE MEDIUM FOR STORING DIGITAL MAP DISPLAY ZOOMING PROGRAM

(75) Inventors: Ryuichi Watanabe, Kanagawa; Masafumi Minami, Tokyo; Hiroto Narioka, Kanagawa, all of (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,703

(22) Filed: Jun. 1, 1998

(30) Foreign Application Priority Data

Jun. 2, 1997 (JP) .............................................. 9-144275

(51) Int. Cl.[7] .................................................. G09G 5/34
(52) U.S. Cl. ........................ 345/123; 345/125; 345/127; 345/131; 345/133; 345/439; 345/440; 345/660; 345/661; 345/669; 345/684; 345/685; 345/686; 345/687; 345/688; 345/784; 345/786; 345/787; 345/800; 345/973; 345/974

(58) Field of Search ................................. 345/127, 131, 345/439, 133, 123, 125, 973, 974, 660, 661, 669, 800, 684, 685, 686, 687, 688, 784, 786, 787, 440

(56) References Cited

U.S. PATENT DOCUMENTS

| | | | |
|---|---|---|---|
| 4,899,292 A | 2/1990 | Montagna et al. ........... 364/521 |
| 5,485,174 A | 1/1996 | Henshaw et al. ........... 345/123 |
| 5,623,588 A | * 4/1997 | Gould ........................ 395/326 |
| 6,215,491 B1 | * 4/2001 | Gould ........................ 345/341 |
| 6,285,347 B1 | * 9/2001 | Watanabe et al. ........... 345/123 |

* cited by examiner

Primary Examiner—Richard Hjerpe
Assistant Examiner—Jean Lesperance
(74) Attorney, Agent, or Firm—Oblon, Spivak, McClelland, Maier & Neustadt, P.C.

(57) ABSTRACT

A digital map display zooming method for continuously enlarging and reducing a displayed portion of a digital map as map information in digital form within a display screen is provided which comprises the steps of displaying the displayed portion of the digital map at the display screen, displaying a scroll part within the display screen for shifting the displayed portion, making the scroll part function as a scale setting part for carrying out enlarging and reducing operations of the displayed portion of the digital map within the display screen, and carrying out enlarging and reducing operations of the displayed portion of the digital map within the display screen by shifting a shifting operation part of the scale setting part.

17 Claims, 10 Drawing Sheets

DIGITAL MAP DISPLAY ZOOMING METHOD, DIGITAL MAP DISPLAY ZOOMING DEVICE, AND STORAGE MEDIUM FOR STORING DIGITAL MAP DISPLAY ZOOMING PROGRAM

BACKGROUND OF THE INVENTION

The present invention relates to a digital map display zooming method, a digital map display zooming device and a storage medium for storing a digital map display zooming program, which are for enlarging and reducing a displayed portion of a digital map as map information in digital form within a display screen.

Digital maps as map information in digital form are maps put into electronic form so as to be handled on the display screen of a computer such as a portable computer etc. This kind of digital map is referred to as an electronic map or map software, where maps can be displayed on a display screen.

With this kind of digital map, a map is displayed on, for example, the display screen of a portable computer so that an operation such that a target is set on the map can be carried out, with these digital maps being applied to car navigation systems etc. in recent years.

Incidentally, related art operation for enlarging or reducing the displayed portion of the digital map within the display screen is carried out by a user operating prescribed buttons.

However, with this kind of operation for enlarging or reducing the displayed portion of the digital map, the displayed portion of the digital map can only be enlarged or reduced in an intermittent manner on certain scales of, for example, about four steps. The displayed portion of the digital map therefore cannot be displayed at a scale on which the user wishes to set.

It is therefore an object of the present invention to solve the aforementioned problem to provide a digital map display zooming method, a digital map display zooming device and a storage medium for storing a digital map display zooming program which are capable of easily displaying the displayed portion at an arbitrary rate of enlargement by a user continuously enlarging or reducing the displayed portion of the digital map while watching the display screen.

SUMMARY OF THE INVENTION

The above object can be achieved in the present invention by a digital map display zooming method for enlarging and reducing a displayed portion of a digital map as map information in digital form within a display screen, the method comprising the steps of displaying the displayed portion of the digital map at the display screen, displaying a scroll part within the display screen for shifting the displayed portion, making the scroll part function as a scale setting part for carrying out enlarging and reducing operations of the displayed portion of the digital map within the display screen, and carrying out enlarging and reducing operations of the displayed portion of the digital map within the display screen by shifting a shifting operation part of the scale setting part.

In the present invention, the scroll part displayed within the display screen for shifting the displayed portion functions as a scale setting part for carrying out enlarging and reducing operations of the displayed portion of the digital map. The user can then carry out enlarging and reducing operations of the displayed portion of the digital map within the display screen by shifting the shifting operation part of the scale setting part.

In this way, the user can freely carry out enlarging and reducing operations of the size of the displayed portion displayed at the display screen with ease by only shifting the shifting operation part of the scale setting part within the display screen while watching the shifting operation part of the scale setting part of the display screen.

In the present invention, if the user preferably carries out an operation while looking at the side end of the display screen so that the displayed portion of the digital map is continuously reduced when shifting the shifting operation part of the scale setting part in an upward direction of the display screen, and on the contrary, the displayed portion of the digital map is continuously enlarged when shifting the shifting operation part of the scale setting part in a downward direction of the display screen, there will be no mistakes in the zooming operations because the displayed portion of the digital map will be enlarged and reduced in conformity with the sense of up and down of the user.

The above object can also be achieved in the present invention by a digital map display zooming device for enlarging and reducing a displayed portion of a digital map as map information in digital form within a display screen, the device comprising a display section having a display screen for displaying the displayed portion of the digital map, a scale setting part provided to be displayed at the display screen of the display section, the scale setting part comprising a scroll part having a shifting operation part and being displayed at the display screen with a function thereof being changed for shifting the displayed portion, and carrying out enlarging and reducing operations of the displayed portion of the digital map within the display screen by operating the shifting operation part, a pointing device for operating the shifting operation part of the scale setting part, and an arithmetic processor for carrying out processing for enlarging and reducing operations of the displayed portion of the digital map within the display screen by shifting the shifting operation part of the scale setting part with the pointing device being operated.

In the present invention the displayed portion of the digital map is displayed at the display screen of the display section. The scale setting part is displayed at the display screen. This scale setting part is a scroll part displayed at the display screen with a function thereof being changed for shifting the displayed portion. The operation of zooming the displayed portion can then be carried out by operating the shifting operation part.

The pointing device is for the user to operate the shifting operation part of the scale setting part.

The arithmetic processor carries out processing for carrying out enlarging and reducing operations of the displayed portion of the digital map within the display screen by shifting the shifting operation part of the scale setting part by operations of the pointing means.

As a result, the user can freely carry out enlarging or reducing operation with ease for the size of the shifting displayed portion displayed at the display screen only by shifting the shifting operation part of the scale setting part within the display screen while watching the shifting operation part.

The aforementioned object can also be achieved in the present invention by a storage medium for storing a digital map display zooming program for enlarging and reducing a displayed portion of a digital map as map information in digital form within a display screen, wherein the program comprises the steps of displaying the displayed portion of the digital map is displayed at the display screen, displaying a scroll part within the display screen for shifting the displayed portion, making the scroll part function as a scale setting part for carrying out enlarging and reducing operations of the displayed portion of the digital map within the display screen by operating the pointing means, and carrying out enlarging and reducing operations of the displayed portion of the digital map within the display screen by shifting a shifting operation part of the scale setting part.

In the present invention, the user can freely carry out enlarging or reducing operation with ease for the size of the displayed portion displayed at the display screen only by shifting the shifting operation part of the scale setting part within the display screen while watching the shifting operation part.

DESCRIPTION OF THE PREFERRED EMBODIMENTS

In the following a preferred embodiment of the present invention will be described in detail on the basis of the attached drawings.

The embodiment described in the following is a specific preferred example of the present invention and is thereby subject to various technical limitations. However, the scope of the present invention is by no means limited to these forms in the following explanation unless otherwise described to limit the present invention.

Figure 1:
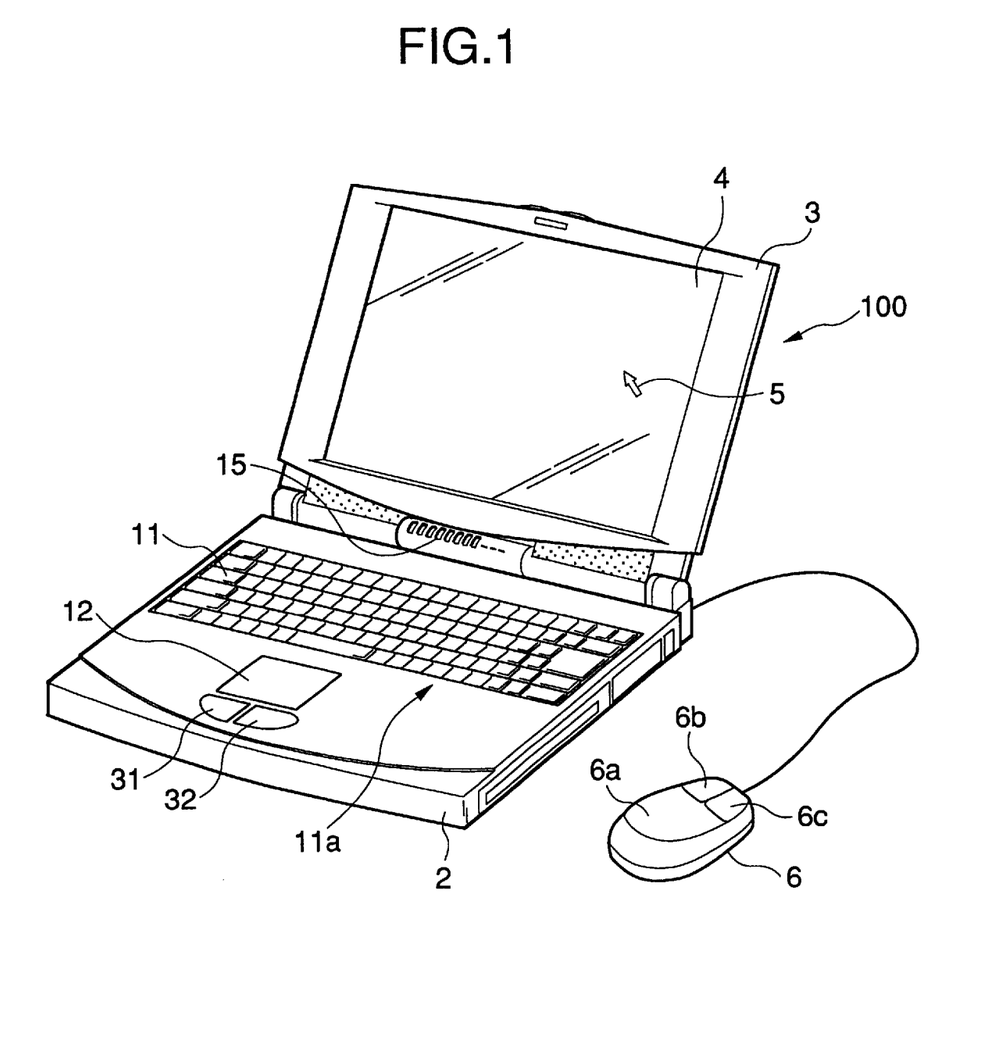
FIG. 1 is a perspective view showing a portable notebook-type personal computer as an embodiment of a digital map zooming device of the present invention.

FIG. 1 is a perspective view showing a preferred embodiment of a digital map zooming device 100 of the present invention. A system configuration for this digital map zooming device 100 is shown in FIG. 2.

The digital map zooming device 100 of FIG. 1 is a so-called portable notebook type personal computer which has a main body 2, display means 3, a mouse 6, a touch pad 12 and touch pads 31 and 32. The display means 3 has a display screen 4 to which, for example, a Liquid Crystal Display (LCD) can be adopted. The display means 3 is attached to the main body 2 in such a manner as to be capable of being opened and closed.

The main body 2 has the aforementioned mouse 6, touch pads 12, 31 and 32 and a keyboard 11 as pointing means, and a power supply lamp 15 etc.

Figure 2:
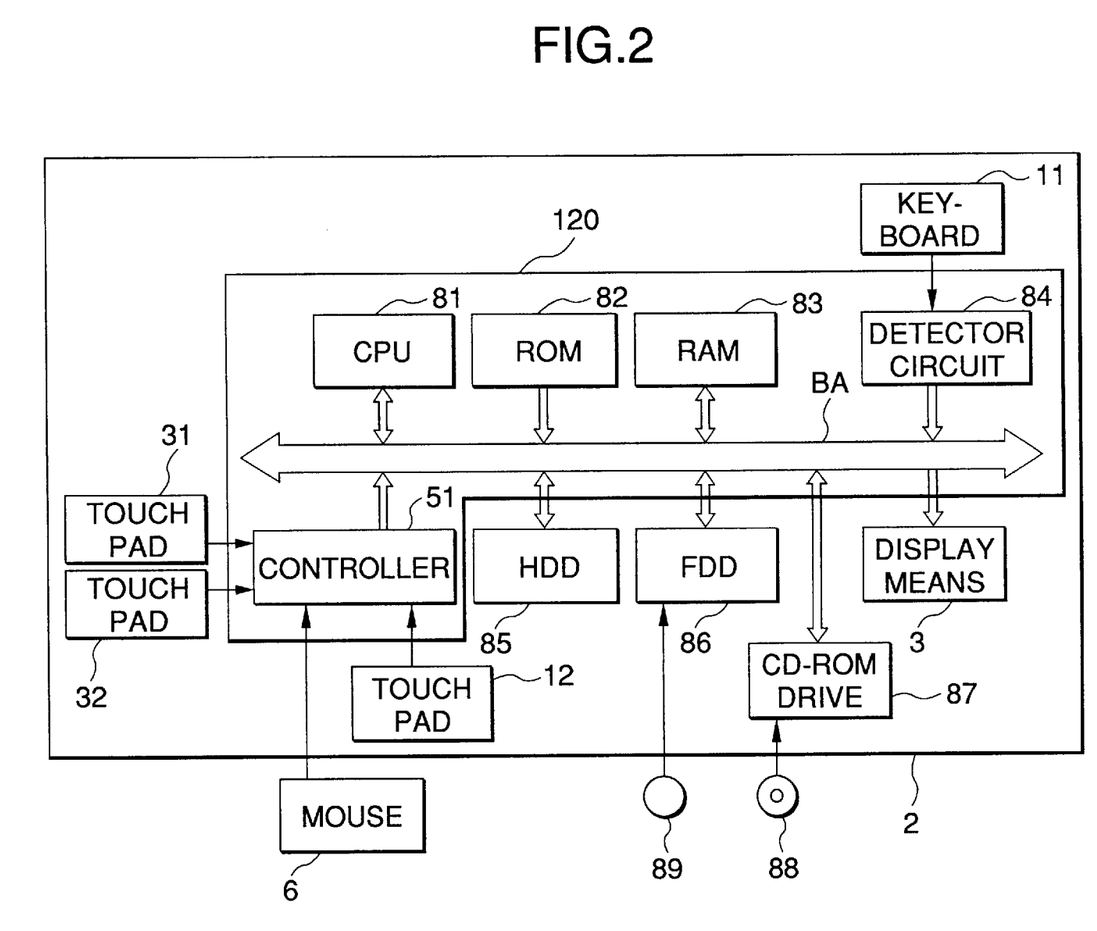
FIG. 2 is a block diagram showing a system for the digital map zooming device of FIG. 1.

FIG. 2 is a block diagram showing the system configuration within the main body 2 and the display means 3.

The main body 2 has a floppy disc drive (FDD) 86, a CDROM (read-only memory utilizing a compact disc) drive 87, a detector circuit 84 for a keyboard 11, a CPU (central processing unit) 81, a ROM (read-only memory) 82, a RAM (random access memory) 83 and a controller 51.

Touch pads 12, 31, 32 and a mouse 6 are connected to a controller 51. The controller 51, the ROM 82, the RAM 83, the detector circuit 84, the hard disc drive 85, the floppy disc drive 86 and the CD-ROM drive 87 are connected to a CPU 81 via a bus BA.

The mouse 6 of FIG. 1 has a mouse body 6a, a left button 6b and a right button 6c. The touch pad 31 with a function similar to that of the left button and the touch pad 32 with a function similar to that of the right button are provided below the touch pad 12.

The CPU 81 of FIG. 2 executes various processings in accordance with a program stored at the ROM 82. The data and programs etc. necessary for the CPU 81 to execute various processes are stored in an appropriate manner at the RAM 83. The detector circuit 84 detects operation of the key 11 and outputs a detection signal to the CPU 81.

The hard disc drive (HDD) 85 stores programs processed by the CPU 81 and data etc. in an appropriate manner. The floppy disc drive (FD) 86 records and plays back data to and from a floppy disc 89 installed therein.

The controller 51 detects operations of the touch pad 12, the touch pads 31 and 32 and the mouse 6 and outputs a detection signal to the CPU 81.

When the user shifts a pointer 5 using the touch pads 12, 31 and 32, the user touches (presses) a prescribed position on the touch pad 12 with their finger, and shifts this touching position in the direction that the pointer 5 is to be shifted. The controller 51 detects this operation, i.e. when the user applies a pressure to the touch pad 12 with their finger, the electrostatic capacity of the position being pressed changes. For example, when a certain position on the touch pad 12 is pressed by a finger, the electrostatic capacitance between a horizontal electrode and a vertical electrode changes largely compared to the electrostatic capacitance between other electrodes.

When a key of the keyboard 11 is operated, the detector circuit 84 outputs a detection signal corresponding to this operation to the CPU 81. The CPU 81 then generates, for example, prescribed character data in accordance with this inputted detection signal with this character data being outputted to the display screen 4 and displayed. In a similar manner, the CPU 81 reads out graphics data for the pointer 5 stored in the ROM 82 and outputs this data to the display screen 4 for displaying. In this way, the pointer 5 is displayed as shown, for example, in FIG. 1.

The controller 51, CPU 81, ROM 82, RAM 83 and detector circuit 84 in FIG. 2 comprise arithmetic processing means 120. The arithmetic processing means 120 is a portion having a function for carrying out enlarging and reducing operations of the displayed portion of a digital map within the display screen as a result of shifting a shifting operation part of a scale setting part to be described later by operating the mouse 6 as the pointing means.

Figure 3:
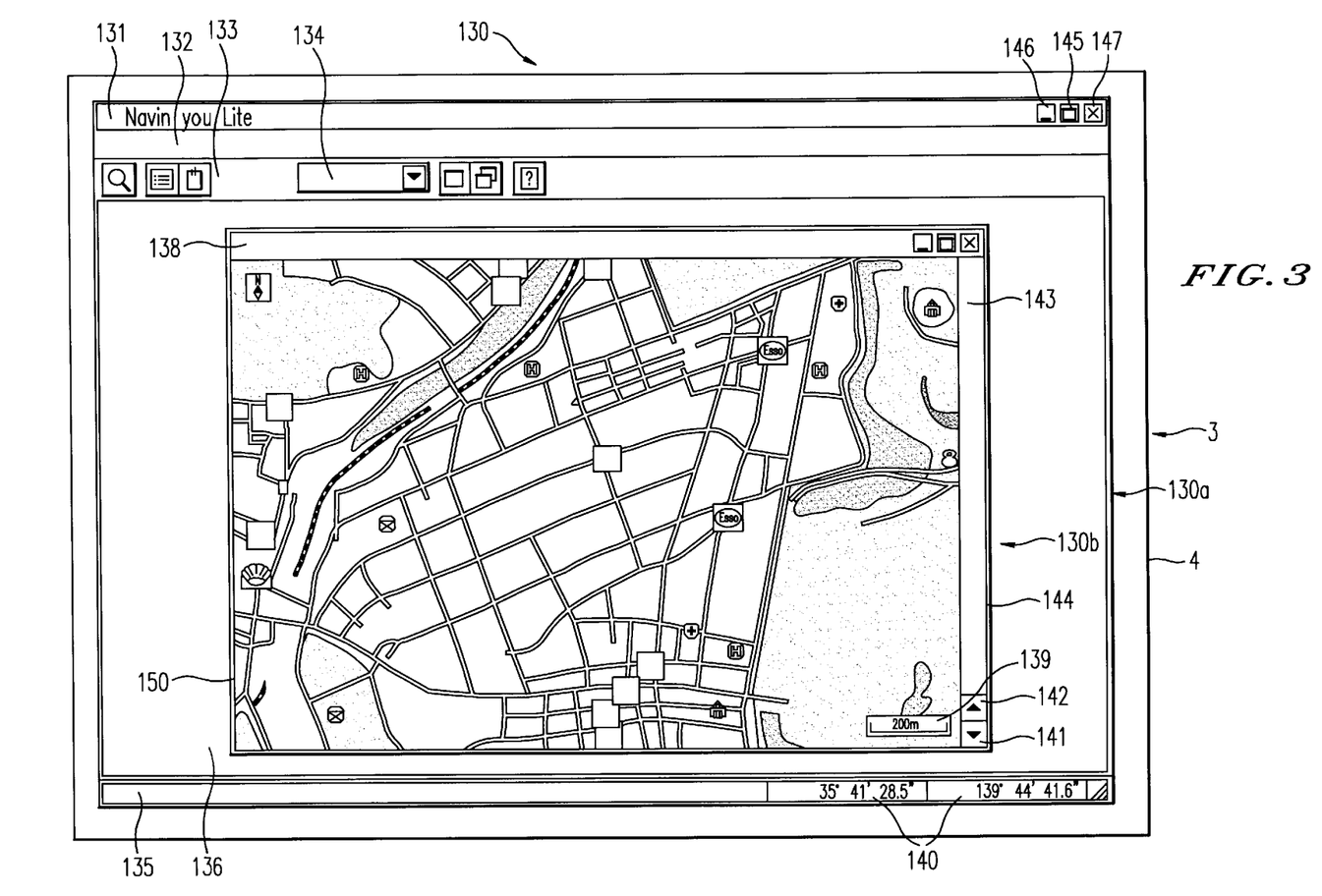
FIG. 3 is a view showing an example of a displayed portion of a digital map displayed on the display screen of the digital map display zooming device of FIG. 1.

FIG. 3 shows an image 130 included in a digital map display zooming program displayed on the display screen 4 of the display means 3 of FIG. 1 and FIG. 2. Although this image 130 is simply an example, a title bar 131, a menu bar 132, a tool bar 133, a (information display) list box 134, a guidance area 135, a map display region 136, a map window title bar 138, a scale display 139, a latitude/longitude display 140, a (zoom in) button 141, a (zoom out) button 142, a scale bar 143, a scale bar knob (also referred to as "slider") 144, a maximizing button 145, a minimizing button 146 and an X button (close button) 147 etc. are displayed within this image 130. A separate window 130b is displayed within a window 130a of the image 130.

Figure 4:
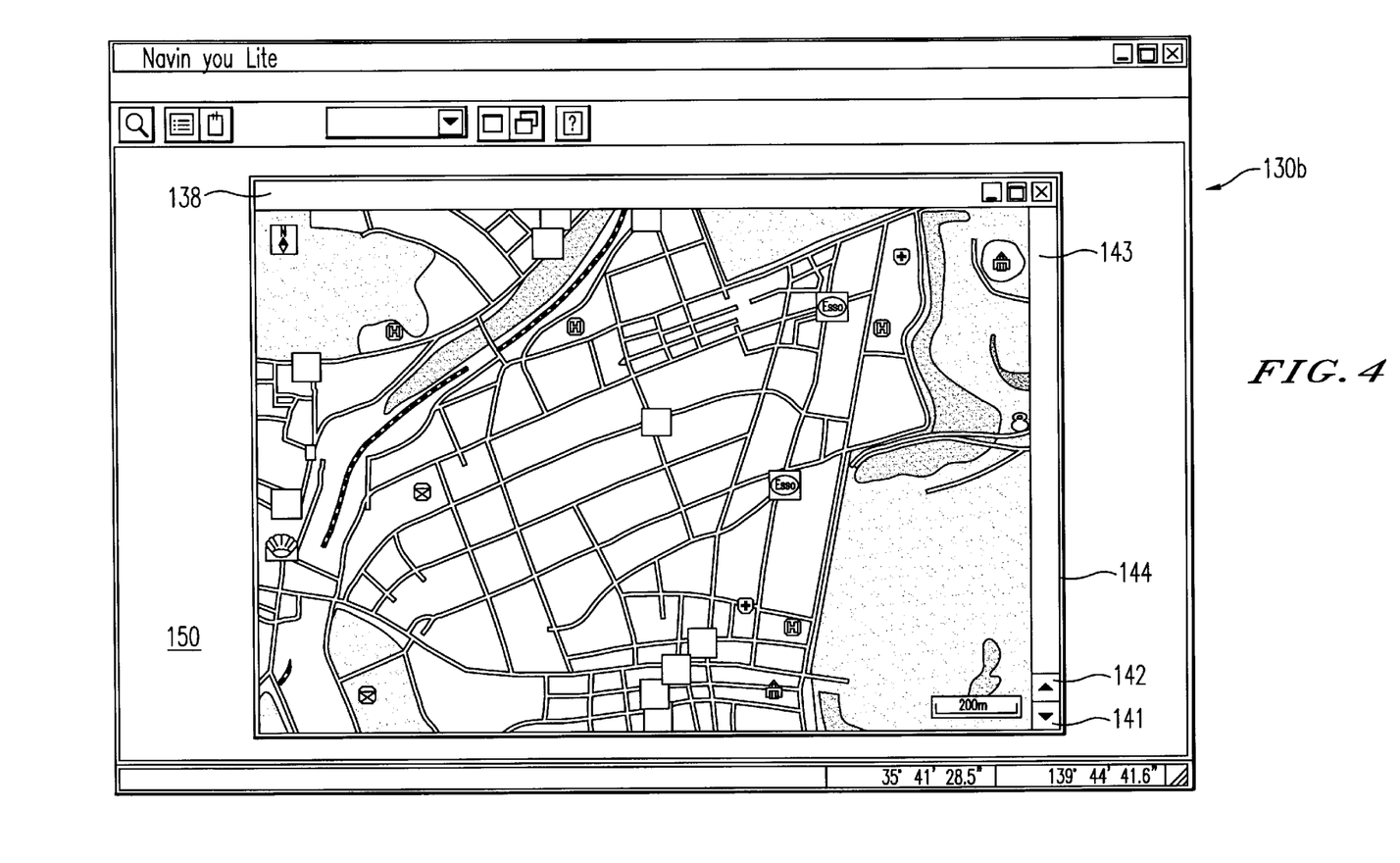
FIG. 4 is a view showing an example of an enlarged display of the displayed portion of the digital map of FIG. 3.

An example of a displayed portion 150 of the digital map is displayed within this window 130b of FIG. 3 and FIG. 4 that is an enlarged display of the displayed portion 150 of FIG. 3. The menu bar 132 is positioned below the title bar 131 and is lined up with function names, and when clicking is performed with the pointer 5 being positioned at this menu bar 132, a more detailed display is given. A window is a displayed portion surrounded by a window-like frame opened on the computer screen. The term "clicking" means an operation of quickly pressing and releasing the mouse button.

Figure 5:
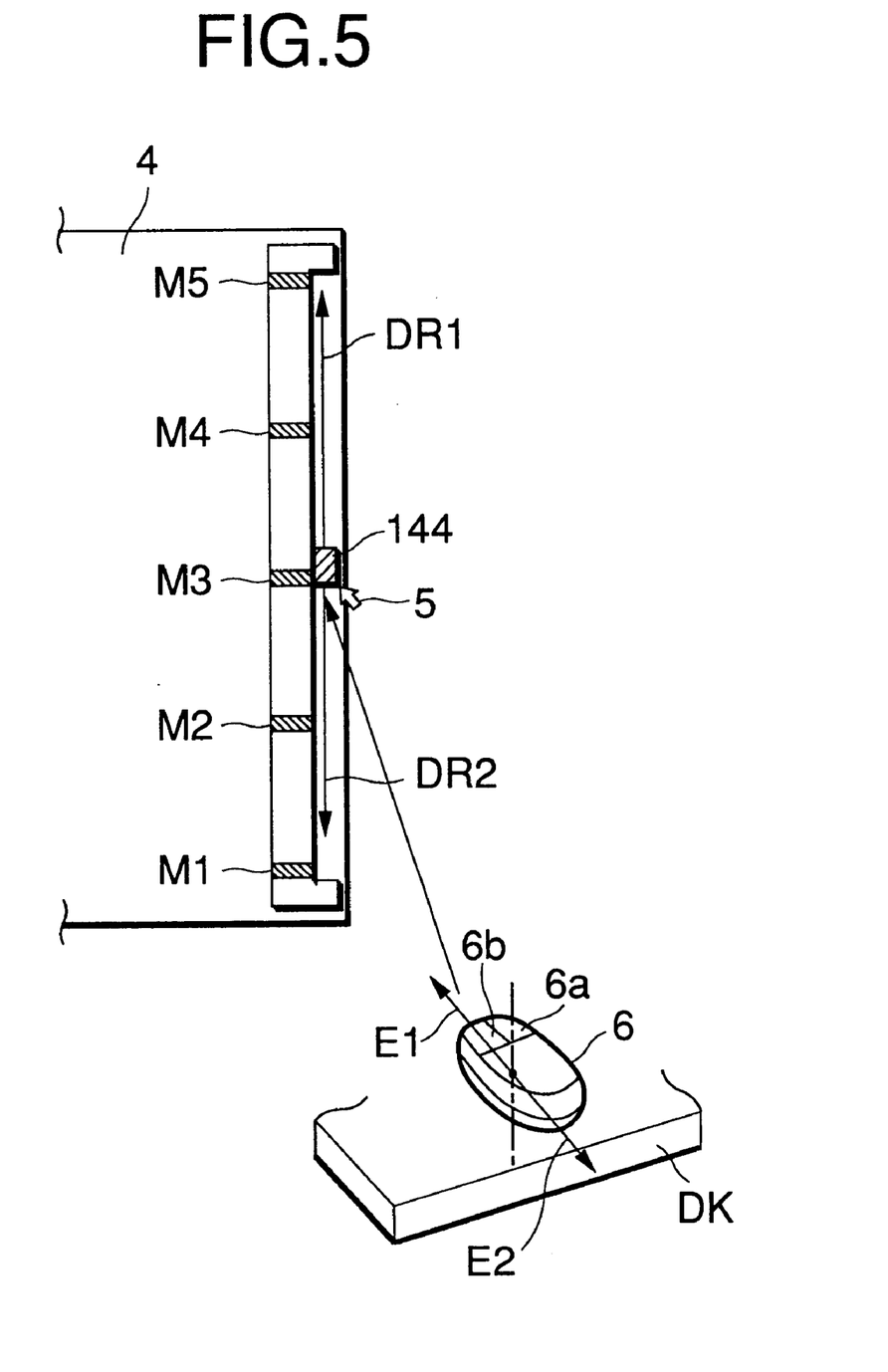
FIG. 5 is a view showing a scale bar, a scale bar knob and a mouse.

FIG. 5 shows a scale bar 143 as the scale setting part shown in FIG. 3 and FIG. 4 and a scale bar knob 144 as a shifting operation part of the scale setting part together with the mouse 6. The scale bar knob 144 and the scale bar 143 can also be selected to function as a scroll bar for scrolling pictures.

The scale bar knob 144 is pointed out by an arrow-type pointer 5 by pressing the left button 6b of the mouse 6 as the pointing means of FIG. 1 and this scale bar knob 144 can be shifted in a reducing direction DR1 (upwards on the display screen) as a result of the user moving the mouse 6 in a direction of, for example, E1 on a desk DK. The scale bar knob 144 can then be shifted in an enlarging direction DR2 (downwards on the display screen 4) as a result of the user moving the mouse 6 in a direction E2.

When the scale bar knob 144 is shifted in the reducing direction DR1, the displayed portion of the digital map 150 displayed at the display screen 4 shown in FIG. 3 and FIG. 4 can be continuously (in an analog manner) reduced in accordance with the amount of shift. For example, the displayed portion of the digital map 150 is continuously reduced as the scale bar knob 144 goes along marks M1, M2, M3, M4 and M5 of the scale bar 143. This presents an image seen from a manned spacecraft rising from earth into space.

Contrary to this, when the scale bar knob 144 is shifted in the enlarging direction DR2, the displayed portion of the digital map 150 can be continuously (in an analog manner) enlarged. This gives an image seen from a spacecraft descending from space to the surface of the earth.

When clicking is made with an arbitrary position of the scale bar 143 being pointed out by the pointer 5, the displayed portion 150 for the map is displayed on the scale value for this position.

In the embodiment in FIG. 5, the marks M1, M2, M3, M4 and M5 of the scale bar 143 show changeover positions i.e. dividing positions of data of the digital map which are also referred to as map layers. The enlargement rate is kept to be changed markedly at each of the marks M1 to M5 as the scale bar knob 144 is shifted along the marks. The enlargement rate of the displayed portion of the digital map 150 can be then made to be changed, for example, in accordance with the enlargement rate indicated by characters at the marks M1 to M5.

Figure 6:
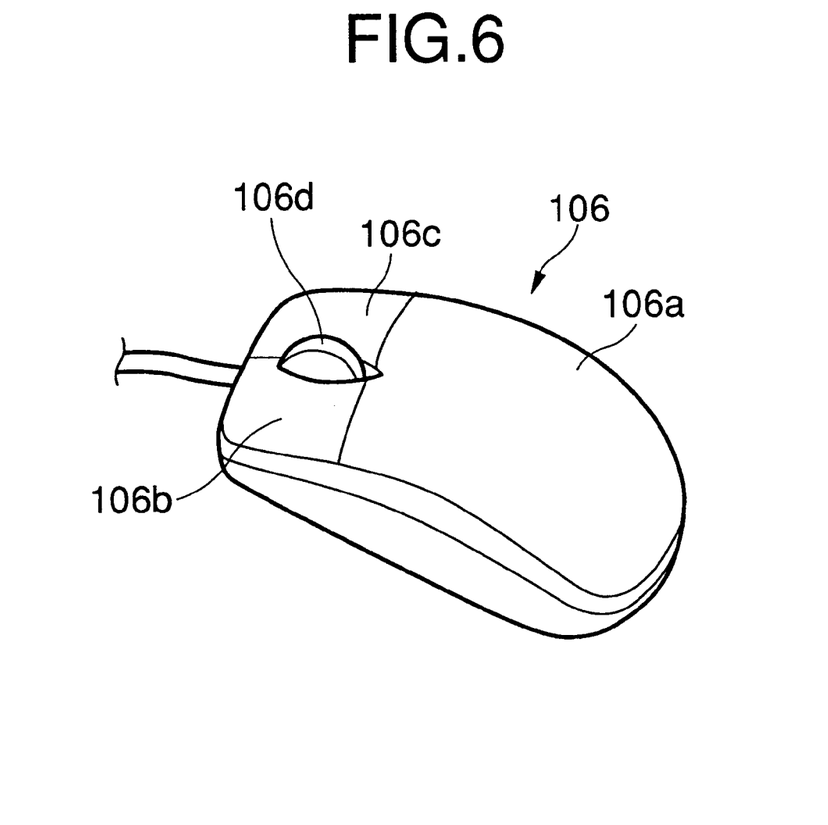
FIG. 6 is a perspective view showing another example of a mouse as a pointing means used in the present invention.
Figure 7:
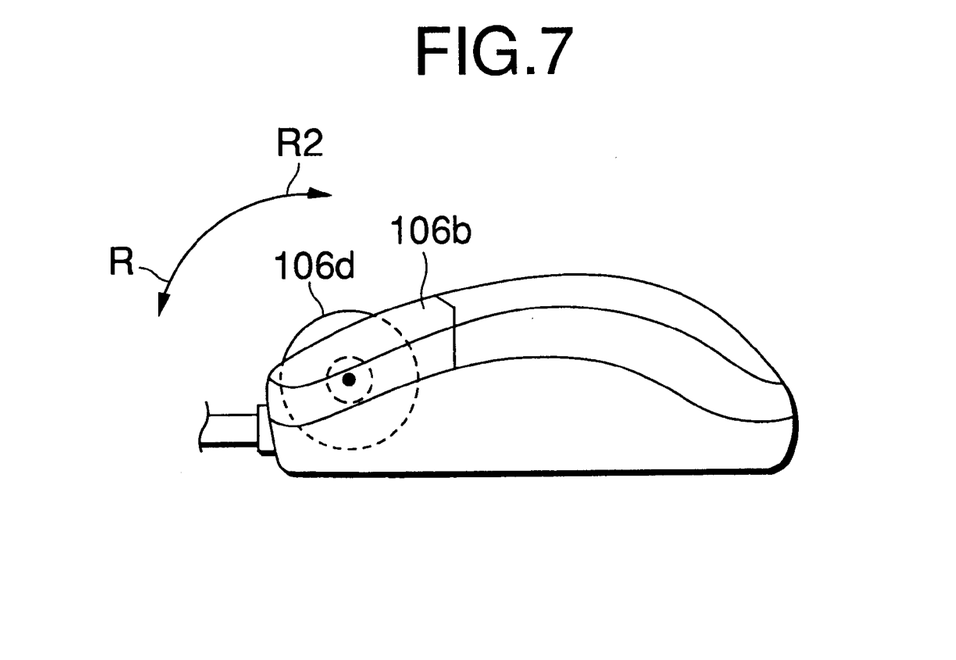
FIG. 7 is a side view of the mouse of FIG. 6.

FIG. 6 shows another example of a mouse which is different from the mouse 6 of FIG. 1 and FIG. 5. This mouse 106 is in the tradename "Intellimouse" of the Microsoft Co., Ltd. with a left button 106b, right button 106c and rotary wheel 106d provided at a main body 106a.

For example, by the user rotating the rotary wheel 106d in the direction R1 while holding down the left button 106d of the mouse 106, the scale bar knob 144 of FIG. 5 can be shifted in the reducing direction DR1 by the amount of rotation of the rotary wheel 106d. Moreover, by rotating the rotary wheel 106d in the direction R2, the scale bar knob 144 can then be shifted in the enlarging direction DR2 in accordance with the amount of rotation.

A mouse is a device that is slid on a desk to point specific portions of the screen.

Figure 8:
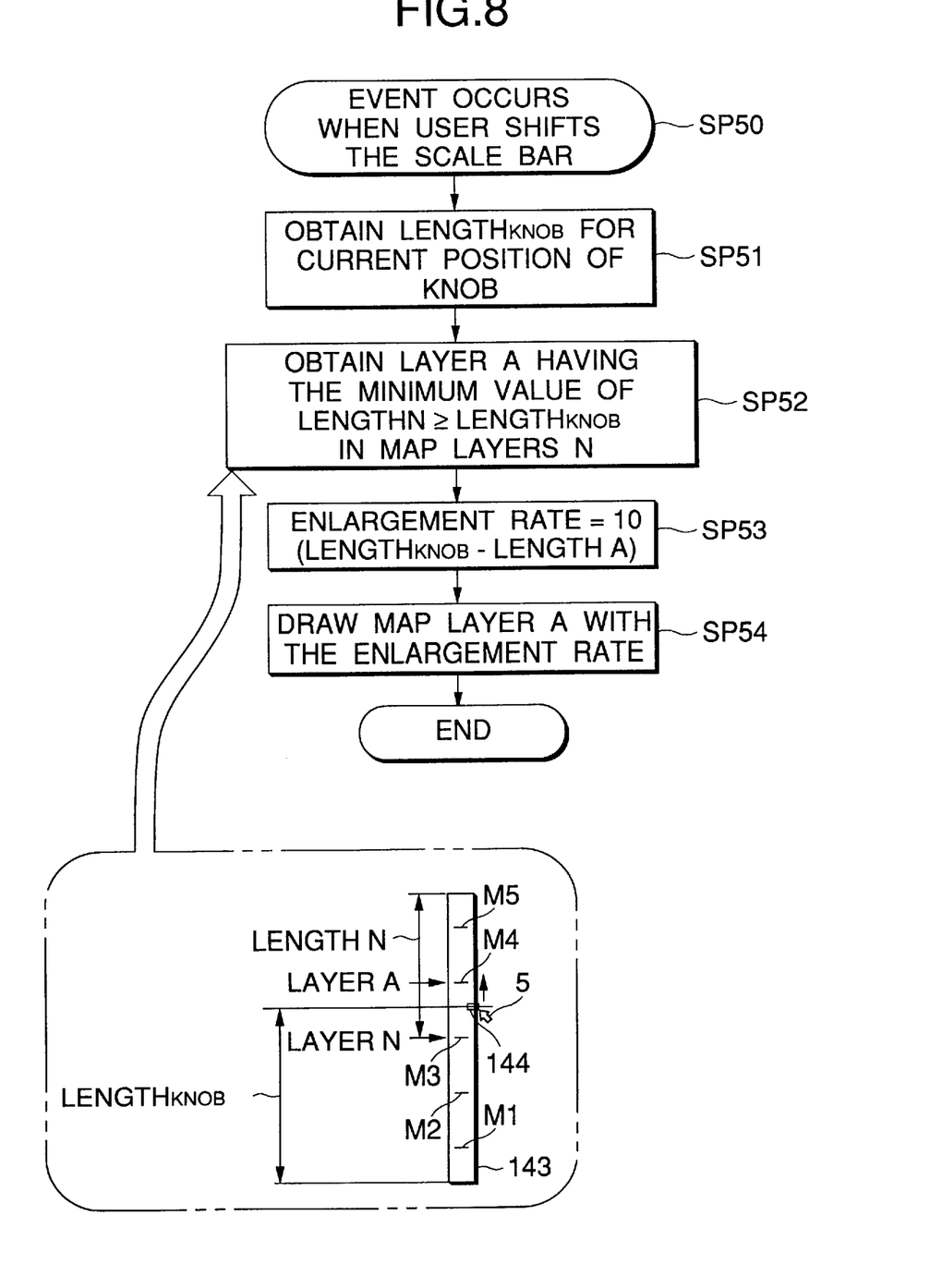
FIG. 8 is a view showing a flowchart for processing as a scale bar knob.
Figure 9:
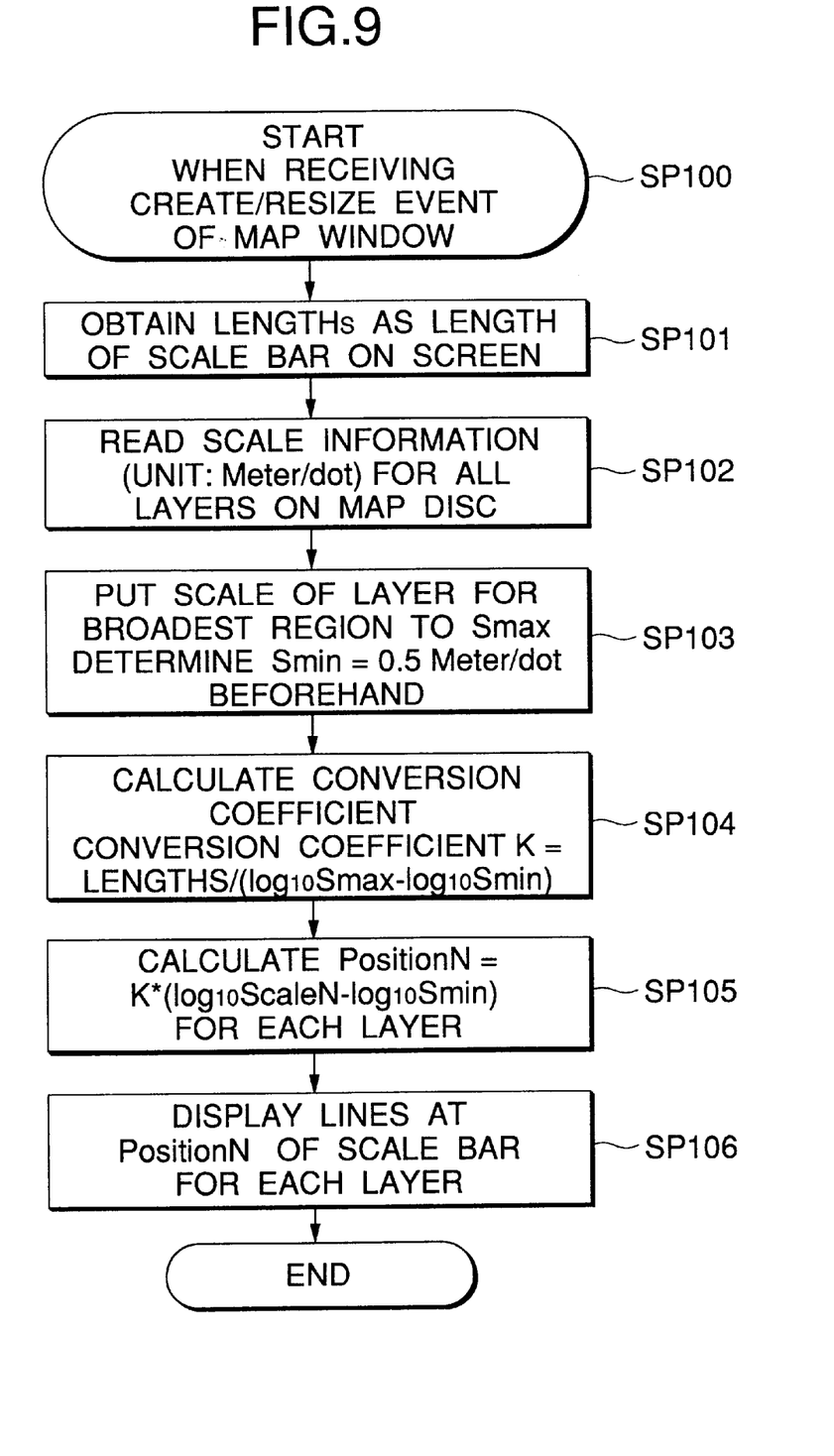
FIG. 9 is a view showing a flowchart of a scale bar display.
Figure 11:
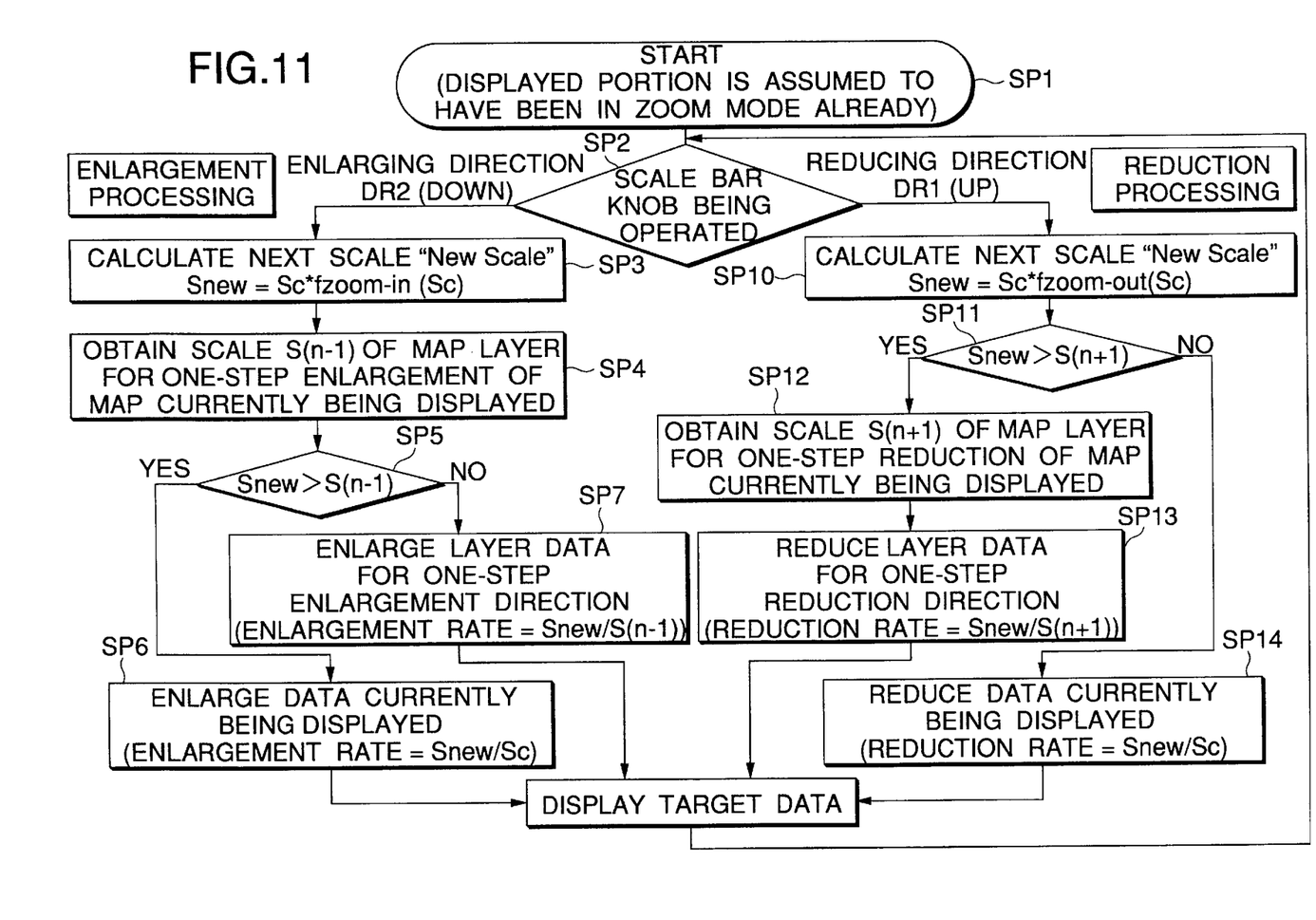
FIG. 11 is a view showing a flowchart of continuous zooming.

The programs for the digital map display zooming method in the embodiment of the present invention are shown in FIG. 8, FIG. 9 and FIG. 11. The programs are operated on the operation system such as Windows' 95 of the Microsoft Co., Ltd. in U.S. The operating system (OS) is a software with functions such as "execution of applications" and "file management" that are the basis for using a computer.

The program for the display zooming method is stored on, for example, the CD-ROM 88 of FIG. 2. The digital map display zooming program of this CD-ROM 88 can then be put onto the hard disc drive 85 by inserting the CD-ROM 88 into the CD-ROM drive 87.

Alternatively, such a digital map display zooming program can be stored on the floppy disc 89 instead of the CD-ROM 88. When the floppy disc 89 is inserted into the floppy disc drive 86, the digital map display zooming program within this floppy disc 89 is then put onto the hard disc 85.

Alternatively, the digital map display zooming program can be put onto the hard disc drive 85 from outside via a network such as the internet.

FIG. 8 shows an example of the processing for enlarging operation of the displayed portion 150 at the display screen 4 when the scale bar knob (also referred to as a slider) 144 shown in FIG. 5 is shifted by the user. In step SP50, an event occurs when the user shifts the scale bar knob 144. In step SP51, the current position of the knob i.e. the length for the current position of the scale bar knob 144 (LENGTH$_{KNOB}$) at the scale bar 143 is obtained.

In step SP52, a map layer A with a length of LENGTH A is obtained which is the minimum of the lengths of LENGTH N for the map layers N at the displayed portion of the digital map 150 that satisfy the condition LENGTH N$\geq$LENGTH$_{KNOB}$. In step SP53, the enlargement rate is then obtained and in step SP54 the map layer A of the displayed portion is drawn at the obtained enlargement rate. The map layer is referred to as map data of the digital map.

FIG. 9 shows an example of the processing for displaying each of scales for map data (layers) of a plurality of scales stored on a map disc (storage medium) such as the CD-ROM 89 on the scale bar 143.

Figure 10:
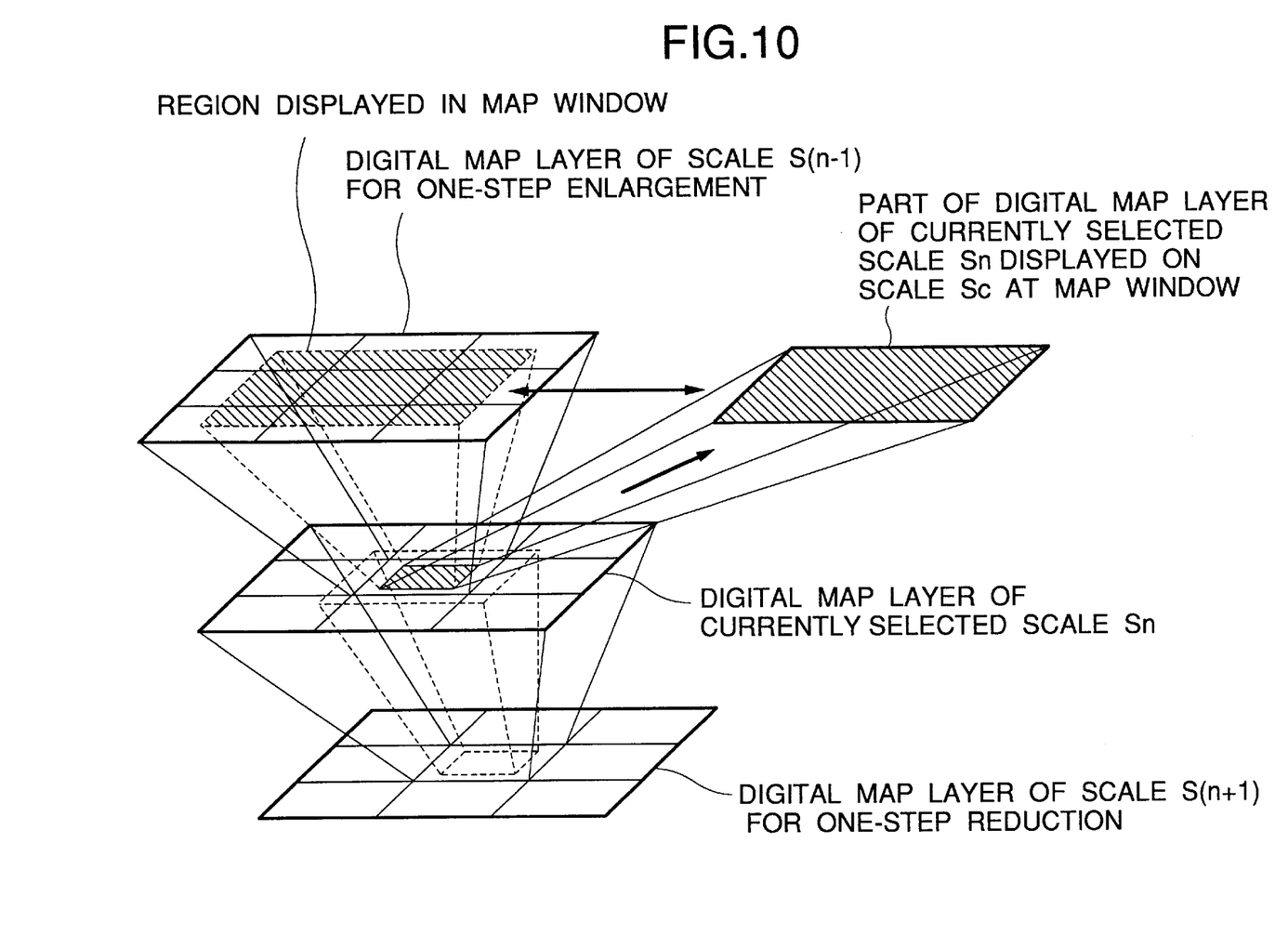
FIG. 10 is a view showing a concept of continuous enlargement and reduction as continuous zooming.

When a CREATE/RESIZE event for a map window is received in step SP100 of FIG. 10, the length of the scale bar 143 at the display screen (LENGTH$_S$) is obtained in step SP101. In step SP102, scale information (unit: Meter/Dot) for all of the map layers on the map disc is read out.

In step SP103, the scale of the map layer for the broadest region of the presented ones is taken to be Smax and the scale Smin of the map layer for the narrowest region is determined to be Smin=0.5 Meters/Dot.

In SP104 and SP105, conversion coefficients K are calculated and the positions N of various map layers L are calculated. In step SP106, linear markers M1 to M5 as shown in FIG. 5 are displayed at prescribed positions of the scale bar 143 for various layers N.

FIG. 10 conceptually shows a currently selected digital map layer of scale Sn used in a continuous zooming, namely continuous enlargement and reduction, of the displayed portion, a digital map layer of scale S(n−1) for one-step enlargement and a digital map layer of scale S(n+1) for one-step reduction in three dimensions.

The above digital map layers are the data for the program shown by the flowchart of FIG. 11.

Next, an example of carrying out a zooming operation of the displayed portion 150 of the digital map in FIG. 3 in accordance with the digital map zooming display program will be described with reference to FIG. 11.

A CD-ROM 88 is inserted into, for example, the CD-ROM drive 87 of FIG. 2. Alternatively, a floppy disc 89 is inserted into the floppy disc drive 86.

As a result, a preferred embodiment of the digital map display zooming program of the present invention, which is stored on the CD-ROM 88 or the floppy disc drive 89, is put onto the hard disc drive 2 of the hard disc via the bus BA.

When these preparations are finished, the window 130b is displayed at the display screen 4 of the display means 3 of FIG. 3. This window 130b is a window of the digital map.

FIG. 11 is a flowchart showing continuous zooming at the displayed portion 150 of the digital map. At the time of starting continuous zooming using the scale bar knob 144 of FIG. 5, the scale for the map layer, i.e. data, within the storage disc such as the CD-ROM is taken to be Sn (unit: meter/dot) and this data is supposed to be in being displayed at the display screen 4 of FIG. 1 on a scale Sc.

Further, the unit (meter/dot) for the scale S expresses the actual distance on the map corresponding to one display pixel.

In FIG. 11, fzoom-in (Sc) represents the enlargement rate (for example, 80%) and fzoom-out (Sc) represents the reduction rate (for example, 125%). The enlargement rate and the reduction rate both relate to two dimensions (line segments).

Currently, the enlargement rate and the reduction rate are set so that they are in a relation as fzoom-in (1/fzoom-out)= constant (for example, 0.8), but this value can be freely changed if so desired. For example, an operation is also possible which increases the enlargement rate depending on acceleration as the surface of the earth 2 becomes closer.

Upon starting in step SP1 of FIG. 11, it is assumed that the displayed portion of the digital map has already been in the zoom mode at this start time.

In step SP2 a determination is made as to whether or not the scale bar knob 144 of FIG. 5 has been shifted in the reducing direction DR1 (upwards) or the enlarging direction DR2 (downwards).

When the scale bar knob 144 is shifted downwards, the process goes to enlargement processing of step SP3, and when the scale bar knob 144 is shifted upwards, the process goes to the reduction processing of step SP10.

In step SP3, a calculation is carried out for the next scale "New Scale" that is to be set by the user with the scale bar knob 144. This new scale is expressed as "Snew". In step SP4, a scale S(n−1) for a map layer (data) is obtained which is for one-step enlargement of the digital map currently being displayed.

In step SP5, the new scale Snew and the scale S(n−1) in step SP4 are compared. When the new scale Snew is greater, the process goes to step SP6, and when this is not the case, the process goes to step SP7.

In step SP6, the map layer (data) currently being displayed is enlarged and displayed. While, in step SP7, the map layer (data) for one-step enlargement is enlarged.

By doing this, the displayed portion can be displayed with respect to the object data at the display screen 4 in FIG. 5.

Compared with this, in step SP10, a calculation is carried out for the next scale "New Scale" that is to be set by the user with the scale bar knob 144. When this new scale "Snew" is larger than the scale S(n+1) of the map layer on the disc, the process goes to step SP12 and when this is not the case the process goes to step SP14.

In step SP12, a scale S(n+1) for the map layer is obtained which is for one-step reduction of the map currently being displayed. Then, in step SP13, the map layer (data) is reduced which is for one-step reduction. Compared with this, the map layer (data) currently being displayed is then reduced in step SP14.

The object data can thus be displayed in being enlarged or reduced continuously and smoothly in response to the scale bar knob 144 being shifted by the user.

The present invention is by no means limited to the above embodiment.

In the above embodiment an example is shown where the digital map display zooming program of the present invention is stored on the CD-ROM 88 or the floppy disc drive 89 shown in FIG. 1. However, the present invention is by no means limited in this respect, and this can also be stored so as to be installed beforehand on a hard disc of the hard disc drive 85. Alternatively, this digital map display zooming program can be stored on, for example, the hard disc 85 of the hard disc drive via a network such as an external internet. Other types of disc such as a high-density recording disc (DVD) can also be used as the recording medium.

Further, the digital map display zooming device of FIG. 1 is a notebook type personal computer, but the present invention is by no means limited in this respect, and can also be applied to desktop personal computers, navigation systems mounted on moving vehicles such as cars and to portable navigation systems.

As described above, according to the present invention, the displayed portion can easily be displayed at an arbitrary enlargement rate by the user continuously enlarging or reducing the displayed portion of the digital map while watching the display screen.

What is claimed is:

1. A digital map display zooming method for enlarging and reducing a displayed portion of a digital map as map information in digital form within a display screen, said method comprising the steps of:

displaying said displayed portion of said digital map at said display screen;

displaying a scroll bar within said display screen for shifting said displayed portion;

making said scroll bar function as a scale setting part for carrying out enlarging and reducing operations of said displayed portion of said digital map within said display screen; and carrying out enlarging and reducing operations of said displayed portion of said digital map within said display screen by shifting a shifting operation part of said scale setting part.

2. The digital map display zooming method of claim 1, wherein said shifting operation part of said scale setting part is displayed at a side end of said display screen, and said displayed portion of said digital map is continuously reduced when said shifting operation part is shifted in an upward direction of the display screen and said displayed portion of said digital map is continuously enlarged when said shifting operation part is shifted in a downward direction of the display screen.

3. A digital map display zooming device for enlarging and reducing a displayed portion of a digital map as map information in digital form within a display screen, said device comprising:

displaying means having a display screen for displaying said displayed portion of said digital map;

a scale setting part provided to be displayed at said display screen of said display means, said scale setting part comprising a scroll part having a shifting operation part and being displayed at said display screen with a function thereof being changed for shifting said displayed portion, and carrying out enlarging and reducing operations of said displayed portion of said digital map within said display screen by operating said shifting operation part;

pointing means for operating said shifting operation part of said scale setting part; and arithmetic processing means for carrying out processing for enlarging and reducing operations of said displayed portion of said digital map within said display screen by shifting said shifting operation part of said scale setting part with said pointing means being operated.

4. The digital map display zooming device of claim 3, wherein said shifting operation part is provided to be displayed at a side end of said display screen, and said arithmetic processing means carries out an arithmetic processing for continuously reducing said displayed portion of said digital map when said shifting operation part of said scale setting part is shifted in an upward direction of said display screen and continuously enlarging said displayed portion of said digital map when said shifting operation part of said scale setting part is shifted in a downward direction of said display screen.

5. The digital map display zooming device of claim 3, wherein said pointing means is provided with a rotational operation part which is operated to rotate so as to shift said shifting operation part of said scale setting part, and said displayed portion of said digital map is continuously reduced when said shifting operation part is shifted in an upward direction of said display screen by rotating said rotational operation part, and continuously enlarged when said shifting operation part is shifted in a downward direction of said display screen.

6. The digital map display zooming device of claim 4, wherein a plurality of changeover marks showing changeover positions for data of scales for said displayed portion of said digital map are arranged at said scale setting part in a direction of operating said shifting operation part at said scale setting part.

7. In a storage medium for storing a digital map display zooming program for enlarging and reducing a displayed portion of a digital map a map information in digital form within a display screen, the improvement wherein said program comprises the steps of displaying said displayed portion of said digital map at said display screen, displaying a scroll bar function as a scale setting part for carrying out enlarging and reducing operations of said displayed portion of said digital map within said display screen by operating said pointing means, and carrying out enlarging and reducing operations of said display portion of said digital map within said display screen by shifting a shifting operation part of said scale setting part.

8. A digital map display zooming method for enlarging and reducing a display portion of a digital map as map information in digital form within a display screen, said method comprising the steps of:

displaying said displayed portion of said digital map at said display screen;

displaying a scroll part within said display screen for shifting said displayed portion;

making said scroll part function as a scale setting part for carrying out enlarging and reducing operations of said displayed portion of said digital map within said display screen;

carrying out enlarging and reducing operations of said displayed portion of said digital map within said display screen by shifting a shifting operation part of said scale setting part; and storing a plurality of digital map data that includes different scale ratios for a substantially same area, wherein at least one of the plurality of digital map data is at least one of enlarged and reduced to generate the displayed portion.

9. The digital map display zooming method of claim 8, wherein said shifting operation part of said scale setting part is displayed at a side end of said display screen, and said displayed portion of said digital map is continuously reduced when said shifting operation part is shifted in an upward direction of the display screen and said displayed portion of said digital map is continuously enlarged when said shifting operation part is shifted in a downward direction of the display screen.

10. The digital map zooming method according to claim 8, wherein said at least one of the plurality of digital map data has a scale ratio corresponding to an amount of shifting performed by the shifting operation part.

11. A digital map display zooming device for enlarging and reducing a displayed portion of a digital map as map information in digital form within a display screen, said device comprising:

display means having a display screen for displaying said displayed portion of said digital map;

a scale setting part provided to be displayed at said display screen of said display means, said scale setting part comprising a scroll part having a shifting operation part and being displayed at said display screen with a function thereof being changed for shifting said displayed portion;

carrying out enlarging and reducing operations of said displayed portion of said digital map within said display screen by operating said shifting operation part;

pointing means for operating said shifting operation part of said scale setting part;

arithmetic processing means for carrying out processing for enlarging and reducing operations of said displayed portion of said digital map within said display screen by shifting said shifting operation part of said scale setting part with said pointing means being operated; and means for storing a plurality of digital map data that includes different scale ratios for a substantially same area, wherein at least one of the plurality of digital map data is at least one of enlarged and reduced to generate the displayed portion.

12. The digital map display zooming device of claim 11, wherein said shifting operation part is provided to be displayed at a side end of said display screen, and said arithmetic processing means carries out an arithmetic processing for continuously reducing said displayed portion of said digital map when said shifting operation part of said scale setting part is shifted in an upward direction of said display screen and continuously enlarging said displayed portion of said digital map when said shifting operation part of said scale setting part is shifted in a downward direction of said display screen.

13. The digital map zooming method according to claim 11, wherein said at least one of the plurality of digital map data has a scale ratio corresponding to an amount of shifting performed by the shifting operation part.

14. The digital map display zooming device claim 11, wherein said pointing means is provided with a rational operation part which is operated to rotate so as to shift said shifting operation part of said scale setting part, and said displayed portion of said digital map is continuously reduced when said shifting operation part is shifted in an upward direction of said display screen by rotating said rotational operation part, and continuously enlarged when said shifting operation part is shifted in a downward direction of said display screen.

15. The digital map display zooming device of claim 11, wherein a plurality of changeover marks showing changeover positions for data of scales for said displayed portion of said digital map are arranged at said scale setting part in a direction of operating said shifting operation part at said scale setting part.

16. In a storage medium for storing a digital map display zooming program for enlarging and reducing a displayed portion of a digital map as map information in digital form within a display screen, the improvement wherein said program comprises the steps of:

displaying said displayed portion of said digital map at said display screen;

displaying a scroll part within said display screen for shifting said displayed portion;

making said scroll part function as a scale setting part for carrying out enlarging and reducing operations of said displayed portion of said digital map within said display screen by operating said pointing means;

carrying out enlarging and reducing operations of said displayed portion of said digital map within said display screen by shifting a shifting operation part of said scale setting part; and storing a plurality of digital map data that includes different scale ratios for a substantially same area, wherein at least one of the plurality of digital map data is at least one of enlarged and reduced to generate the displayed portion.

17. The digital map zooming method according to claim 16, wherein said at least one of the plurality of digital map data has a scale ratio corresponding to an amount of shifting performed by the shifting operation part.

* * * * *